No. 887,072. PATENTED MAY 12, 1908.
M. A. DELANEY.
LEADING DEVICE.
APPLICATION FILED JAN. 12, 1907.

Attest:

Inventor:
Mary A. Delaney
by Dickerson, Brown,
Raegener + Binney, Attys.

UNITED STATES PATENT OFFICE.

MARY A. DELANEY, OF NEW YORK, N. Y.

LEADING DEVICE.

No. 887,072.  Specification of Letters Patent.  Patented May 12, 1908.

Application filed January 12, 1907. Serial No. 351,938.

*To all whom it may concern:*

Be it known that I, MARY A. DELANEY, a citizen of the United States, resident of the borough of Manhattan, city, county, and State of New York, have invented certain new and useful Improvements in Leading Devices, of which the following is a specification, accompanied by drawings.

This invention relates to a device for leading pet dogs or other pet animals when they are taken out to accompany a person in his or her walks.

The invention is particularly adapted for ladies, and is to take the place of the present inconvenient leading device or leash, which ordinarily consists simply of a chain or strap provided at one end with a ring or holder for the hand, and at the other end with a snap hook for the dog's collar.

It is usually desirable that the dog should have a certain freedom in running about, but it is difficult to prevent the animal from running on the wrong side of lamp posts or pedestrians, thus causing much annoyance to the owner, who is constantly required to adjust the length of the leash in her hand and frequently the leash is dropped and the dog permitted to run away. In order to prevent the dog from taking a long course in running about it is necessary to quickly wrap the cord or chain around the hand and unwrap it again after the object has passed, which is an awkward performance when obliged to be done frequently.

The objects of the present invention are to obviate and overcome all these difficulties and annoyances due to the usual form of leash, and prevent the leash from becoming tangled as the dog runs about.

To these ends the invention consists of a leading device for carrying out the above objects embodying the features of construction, combinations of elements and arrangement of parts having the general mode of operation substantially as hereinafter described and claimed in this specification and shown in the accompanying drawings, in which,—

Figure 1:
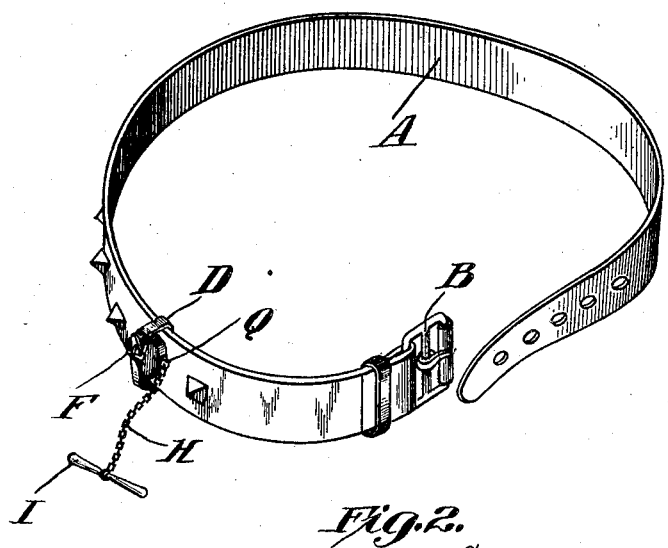
Figure 2:
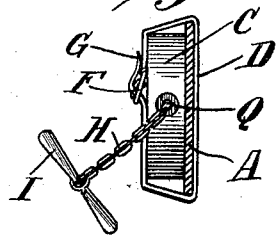
Figure 3:
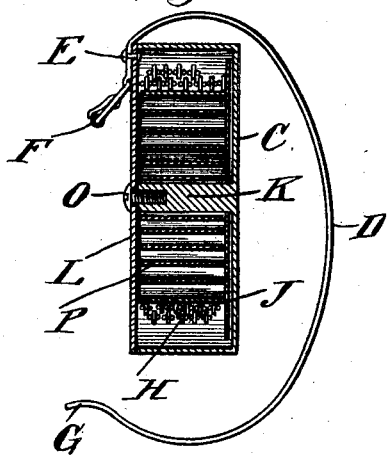

Figure 1 is a perspective view of a dog collar provided with my improved leash;
Fig. 2 is a transverse sectional view of a collar showing the leash in position thereon; Fig. 3 is an enlarged detail transverse sectional view showing one form of construction of a portion of the leash.

Referring to the drawings, A represents a suitable dog collar, provided with any suitable buckle B, and adapted to be provided with a leash or leading device, constructed in accordance with my invention.

C represents a suitable casing adapted to be adjustably secured to the collar A in any suitable manner as by means of the strap D, which is secured to the casing as by means of the rivet E, which is provided with a suitable buckle F or other fastening device, with which the end G of the strap coöperates. The strap is adapted to be passed over the collar and carried around the casing C and secured to the buckle F, thereby adjustably securing the casing to the collar. The leash may be constructed in the form of a chain H or a strap if desired having a handle or holding device I at one end, adapted to be held in the hand. Inside the casing C is provided a drum J adapted to rotate on the central spindle K, which preferably forms a portion of the back of the drum. The face or cover of the drum L is adapted to be secured in position on the end of the spindle K, as by means of the screw O. Within the drum J is a coil spring P, one end of which is adapted to be secured to the spindle K while the other end is adapted to be secured to the drum.

The chain H is adapted to be secured to the outside of the drum, and as the tension of the spring winds up the drum, the chain or cord or strap is wound on the outside of the drum within the casing C. As shown, the chain H passes through a suitable aperture in the casing, and is provided with a stop Q to prevent the chain from being entirely wound up and leave a portion of the end of the chain to be grasped by the hand. As the chain is pulled out the spring is wound up and as the chain is released the spring winds it up within the casing.

In operation the leash is secured to the dog's collar and the handle I is held in the hand. As the dog runs about and runs further away from his master or mistress, the leash is paid out and the spring is wound up. As the dog runs nearer his master or mistress, the spring automatically rotates the drum within the casing and winds up the chain or leash, thereby automatically preventing the leash from becoming entangled, and obviating the necessity of winding the leash about the owner's hand to take up slack. If the dog is allowed to run loose, it is unnecessary to remove the leash from the dog's collar for the leash will be automatically wound up within the casing. If, for instance, the dog is in the house, it is unnecessary to remove the leash, the animal may be allowed to run about and when it is desired to take him out again, the leash is grasped in the hand and is ready for operation.

Another advantage of this device resides in the fact that it is not apt to be lost or misplaced for it is always on the dog's collar ready for use.

I claim and desire to obtain by Letters Patent the following:

The combination with a collar, a leading device comprising a casing, a spring actuated drum, a leash adapted to be wound upon said drum, means within said casing for automatically winding up the leash and permitting the leash to unwind and means for detachably securing the casing directly to said collar.

In testimony whereof I have signed this specification in the presence of two subscribing witnesses.

MARY A. DELANEY.

Witnesses:
GEO. M. BURRELL,
P. A. WIGGINS.